United States Patent [19]
Ryles et al.
[11] Patent Number: 4,573,533
[45] Date of Patent: Mar. 4, 1986

[54] METHOD FOR USING THERMALLY STABLE MOBILITY CONTROL AGENTS FOR HARSH ENVIRONMENTAL RESERVOIRS

[75] Inventors: Roderick G. Ryles, Stamford; Albert G. Robustelli, Darien, both of Conn.
[73] Assignee: American Cyanamid Company, Stamford, Conn.

[21] Appl. No.: 622,899
[22] Filed: Jun. 21, 1984
[51] Int. Cl.[4] ............ E21B 43/22
[52] U.S. Cl. ............ 166/275; 252/8.55 D
[58] Field of Search ............ 166/273, 274, 275; 252/8.55 D

[56] References Cited

U.S. PATENT DOCUMENTS

| | | | |
|---|---|---|---|
| 3,679,000 | 7/1972 | Kaufman | 166/273 |
| 3,800,877 | 4/1974 | Knight | 166/273 X |
| 3,858,652 | 1/1975 | Rhudy et al. | 166/274 |
| 3,945,929 | 3/1976 | Martin | 166/275 X |
| 3,953,341 | 4/1976 | Martin | 166/274 X |
| 4,458,753 | 7/1984 | Philips et al. | 166/275 X |

FOREIGN PATENT DOCUMENTS

| | | |
|---|---|---|
| 115836 | 8/1984 | European Pat. Off. . |

*Primary Examiner*—George A. Suchfield
*Attorney, Agent, or Firm*—Frank M. Van Riet

[57] ABSTRACT

Copolymers of 2-acrylamido-2-methylpropane sulfonic acid or its salts are used to maintain the viscosity of aqueous solutions thereof in the presence of divalent salt containing-waters during the enhanced recovery of petroleum from sub-terranean petroleum-bearing deposits.

11 Claims, No Drawings

METHOD FOR USING THERMALLY STABLE MOBILITY CONTROL AGENTS FOR HARSH ENVIRONMENTAL RESERVOIRS

BACKGROUND-OF-THE-INVENTION

U.S. Pat. No. 3,679,000 discloses the use of various N-sulfohydrocarbon-substituted acrylamides for controlling the viscosity of aqueous media used in water-flooding operations for enhanced petroleum recovery. The polymers are described as containing 5–95%, by weight, of the N-sulfohydrocarbon-substituted acrylamide, preferably 50–95%, by weight, and even more preferably 70–95%, by weight. Comonomers such as acrylic monomers e.g. acrylic or methacrylic acid or salts, acrylamide, methacrylamide etc., are taught.

While the polymers discussed above and other commercially used polymers such as acrylamide-ammonium acrylate copolymers and polysaccharides have usually proven to be effective for the control of the viscosity of aqueous media, in many instances, the viscosity of the copolymers or material breaks down when the temperature of the well interior at the petroleum bearing deposit reaches above about 60° C. i.e. preferably about 60° C.–120° C. or, alternatively, when prepared and/or used in the presence of oxygen, or both. Furthermore, the presence of divalent metal ions in the water already present in the wells or in that used to flood the wells during the enhanced oil recovery also tends to participate in the degradation of the copolymers and other materials which are added thereto. Such divalent metal ions are normally found in hard waters.

It therefore would solve a long-felt need if a method could be discovered for treating wells which exhibit temperatures above about 60° C. i.e. those preferably ranging from about 60° C. to about 120° C., during secondary oil recovery, especially in the presence of mineral water containing divalent salts without the substantial accompanying break-down of polymer viscosity.

SUMMARY OF THE INVENTION

It has now been found that the viscosity degradation of 2-acrylamido-2-methylpropane-sulfonic acid (AMPS) polymers used in enhanced oil recovery, caused by the presence of high temperatures and/or divalent salt-containing water which is either present in the subterranean petroleum-bearing deposits or which is used to form the polymer solution per se which is injected into the well can be substantially reduced and oftimes overcome by the use of a specific concentration of the AMPS monomer in an acrylic copolymer and the injection of the water solution thereof under anaerobic conditions.

DESCRIPTION OF THE INVENTION INCLUDING PREFERRED EMBODIMENTS

The present invention refers to a method for recovering petroleum from a sub-terranean petroleum-bearing deposit wherein a viscous polymer solution is injected into the area of said deposit through at least one input well to cause said petroleum to flow from said area for collection through at least one output well. The present improvement comprises controlling or maintaining the viscosity of the polymer solution by utilizing, in the substantial absence of oxygen, i.e., under anaerobic conditions, a water-soluble copolymer containing from about 30 to about 70 mole percent of 2-acrylamido-2-methylpropanesulfonic acid or a salt thereof and from about 70 to about 30 mole percent of an acrylic monomer, the temperature at the petroleum-bearing deposit being above about 60° C., preferably, ranging from about 60° C. to about 120° C., and even more preferably from about 70° C. to 90° C.

As mentioned above, by the use of this method, the viscosity of the water solution of polymer which is injected into the input well is maintained substantially constant over the period of time required to force the petroleum out of the deposits and into the output well. The presence of divalent salts and/or the temperature of the deposits, which usually contributes significantly to the viscosity breakdown of such polymers, do not materially affect the polymer used herein because of the presence of the specific AMPS copolymers employed and the fact that the copolymers are maintained and used under anaerobic conditions.

Although the use of fresh water for the water-flooding of sub-terranean deposits and the preparation of polymer solutions used for such purpose has been employed in the past, it is of course, from an economical standpoint, preferred to use mineral-containing waters therefor. The present invention encompasses the use of such fresh water or mineral-containing waters having a divalent salt concentration of at least 100 ppm, preferably at least 500 ppm for preparation of the polymer solution. The divalent salts usually are present in such water in the form of calcium and magnesium salts alone or in conjunction with sodium salts. Alternatively, of course, fresh water solutions of the copolymer can be injected into wells which already contain divalent salt containing waters.

The copolymers useful in the instant process employ 2-acrylamido-2-methylpropanesulfonic acid (AMPS) or a salt thereof in concentrations ranging from about 30–70 mole percent, perferably from about 40–70 mole percent. The salts of this monomer are usually alkali metal or ammonium salts with sodium and potassium salts being preferred.

The comonomers used in conjunctin with the AMPS monomer are acrylic comonomers such as acrylic acid, methacrylic acid; salts thereof such as sodium acrylate and acrylamides, such as acrylamide, methacrylamide and the like.

The higher amounts of acrylic comonomer may be used when the temperature of the petroleum-bearing deposit is at the lower end of the 60°–120° C. range. When the temperature thereof is higher than about 70° C., the acrylic monomer concentration should be reduced i.e. to 60 mole percent or less. The preferred comonomer is acrylamide.

The copolymers may be prepared by any known method such as bulk, solution, suspension in emulsion so long as the polymerization is conducted in the absence of oxygen and the resultant copolymer is maintained and used under a substantially oxygen-free atmosphere. The molecular weight of the copolymer should be at least about 500,000, preferably at least about 1,000,000.

By the terms "in the substantial absence of oxygen" or "under anaerobic conditions", as used herein, is meant that from point where the copolymer is added to the water, through the oil well pipeline and to the subterranean strata, the presence of oxygen is maintained at a minimum. The copolymer itself should also be prepared and stored under conditions conducive to oxygen elimination. The elimination of the oxygen can be accomplished by the use of oxygen scavengers such as sodium dithionite, sodium metabisulfite etc., by the use of an inert gas sparge such as nitrogen, argon etc., and the like.

The following examples are set forth for purposes of illustration only and are not to be construed as limitations on the present invention except as set forth in the appended claims. All parts and percentages are by weight unless otherwise specified.

In the following examples, polymer solutions are prepared by dissolution in distilled water, normally 2 hours for dry and liquid polymers and about 16 hours for gel polymers. Salt is added and the solution is then filtered through a 150 mesh stainless steel screen. The composition of the synthetic sea water is as follows:

2.3%: NaCl 0.13%: $Na_2SO_4$ 0.53%: $MgCl_2$ 0.11%: $CaCl_2$

Test solutions are essentially free from dissolved oxygen and are aged at controlled elevated temperature by the procedure described in Society of Petroleum Engineers, Paper No. 12008; "Thermal Stability Testing of Mobility Control Reagents".

The polymer concentration is 2000 ppm of real polymer on solution in all examples unless otherwise specified. The viscosity of the copolymers in all examples is measured by use of a Brookfield Viscometer fitted with a UL adaptor at 25° C.

Anaerobic Test Method

Conditions close to the anaerobic are achieved by aging solutions in a sealed glass ampoule. Several ampoules are attached to a manifold for loading with test solution at a single time. Each solution is purged with nitrogen (<25 ppm oxygen) for at least one hour before the ampoules are filled. A gas reservoir is attached to the manifold and vacant ampoules are successfully evacuated to <0.1 mmHg and then filled with nitrogen three times. With the whole assembly under a positive nitrogen atmosphere, each ampoule is one half filled with test solution. The reservoir is evacuated to <0.1 mm Hg and isolated from the vacuum source. All gases dissolved in the test solutions are removed following a nine cycle procedure. Ampoules are then flame-sealed and aged at the designated temperature.

EXAMPLE 1

Following the test method described above, various copolymer solutions, in harsh water at 90° C., are tested for viscosity maintenance. As can be seen from Table 1, below, solutions of copolymers, containing 10 and 20 mole percent of AMPS, the remaining being acrylamide (AM), exhibit a complete break-down in viscosity after 146 and 109 days, respectively, whereas polymers containing 30-70 mole percent AMPS and AM retain viscosity.

TABLE 1

THERMAL STABILITY UNDER ANAEROBIC CONDITIONS
9% NaC, 1% $CaCl_2$ AT 90° C.

| MOLE % AMPS IN COPOLYMER | DAYS ↓ | 60 | 30 | 12 | 6 | Viscosity mPa · s[1] ← r.p.m. |
|---|---|---|---|---|---|---|
| 10 | 0 | — | 12.16 | 14.4 | 15.6 | GEL |
| | 14 | — | 12.56 | 14.4 | 15.7 | |
| | 56 | — | 10.12 | 11.35 | 11.6 | |
| | 146 | — | 4.26 | — | — | |
| 20 | 0 | — | — | 28.5 | 37.3 | |
| | 14 | — | — | 25.5 | 34.5 | |
| | 56 | — | — | 26.0 | 34.6 | |
| | 109 | — | — | 7.45 | — | |
| 30 | 0 | — | 19.06 | 26.6 | 35.1 | |
| | 14 | — | 17.84 | 25.3 | 32.7 | |
| | 57 | — | 17.04 | 24.05 | 31.6 | |
| | 158 | — | 15.2 | 20.5 | 25.2 | |
| | 252 | — | 13.26 | 17.05 | 20.5 | |
| 40 | 0 | — | 13.4 | 16.8 | 22.6 | |
| | 14 | — | 13.86 | 17.65 | 23.0 | |
| | 56 | — | 13.9 | 17.55 | 22.9 | |
| | 119 | — | 13.34 | 16.55 | 19.9 | |
| 50 | 0 | — | 14.54 | 18.3 | 22.3 | |
| | 14 | — | 13.60 | 18.0 | 21.6 | |
| | 58 | — | 13.64 | 18.0 | 21.6 | |
| | 169 | — | 13.44 | 17.6 | 20.8 | |
| | 377 | — | 12.0 | 15.3 | 18.1 | |
| 70 | 0 | — | 12.32 | 16.05 | 18.8 | |
| | 14 | — | 11.54 | 14.50 | 16.6 | |
| | 58 | — | 11.64 | 14.65 | 16.8 | |
| | 169 | — | 12.00 | 15.04 | 17.2 | |
| | 377 | — | 11.04 | 13.50 | 15.3 | |

EXAMPLE 2 (COMPARATIVE)

Following the procedure of Example 1, various commerically available copolymers of ammonium acrylate (30 mole %) plus acrylamide (70% mole %) indicated below as "Polyacrylamide" and xanthan (polysaccharide) are tested for viscosity degradation. The results are set forth in Table 2, below. In each instance, polymer viscosity breakdown is recorded.

TABLE 2

THERMAL STABILITY UNDER ANAEROBIC CONDITIONS
9% NaCl, 1% $CaCl_2$

| | | DAYS ↓ | 60 | 30 | 12 | 6 | Viscosity mPA · $s^{-1}$ ← r.p.m. |
|---|---|---|---|---|---|---|---|
| 70° C. | Xanthan (1000 p.p.m.) | 0 | 7.73 | 10.3 | 14.7 | 18.2 | PRECIPITATE |
| | | 13 | 2.63 | — | — | — | |
| | | 32 | 1.26 | — | — | — | |
| 90° C. | Polyacrylamide A 2000 p.p.m. | 0 | 9.07 | 9.8 | 11.1 | 11.1 | PRECIPITATE |
| | | 14 | 5.21 | 5.4 | 5.5 | — | |
| | | 28 | 2.58 | — | — | — | |
| 90° C. | Polyacrylamide B 2000 p.p.m. | 0 | — | — | 25.5 | 30.4 | PRECIPITATE |
| | | 14 | — | — | 11.6 | — | |
| | | 28 | — | — | 10.5 | — | |
| 70° C. | Polyacrylamide A 2000 p.p.m. | 0 | 9.58 | 10.56 | 11.6 | 11.8 | |
| | | 14 | 8.54 | 9.34 | 10.15 | 10.6 | |
| | | 56 | 8.63 | 9.44 | 10.20 | 10.6 | |
| | | 170 | 7.53 | 8.02 | 8.6 | 7.3 | |
| 70° C. | Polyacrylamide B 2000 p.p.m | 0 | — | — | 26.3 | 29.4 | |
| | | 14 | — | — | 22.75 | 26.2 | |

TABLE 2-continued

| THERMAL STABILITY UNDER ANAEROBIC CONDITIONS 9% NaCl, 1% $CaCl_2$ | | | | | |
|---|---|---|---|---|---|
| DAYS | 60 | 30 | 12 | 6 | Viscosity mPA · $s^{-1}$ ← r.p.m. |
| 56 | — | — | 19.3 | 21.6 | |
| 173 | — | — | 6.1 | — | |

Xanthan is commercially available as FLOCON ® 4800
B High Molecular Weight Polyacrylamide

EXAMPLE 3

The procedure of Example 1 is again followed except that the water contains less $CaCl_2$ and includes $MgCl_2$. Results are set forth in Table 3, below. Again, viscosity stability is attained.

TABLE 3

THERMAL STABILITY UNDER ANAEROBIC CONDITIONS
9% NaCl, 0.66% $CaCl_2$, 0.34% $MgCl_2$ AT 90° C.

| MOLE % AMPS IN COPOLYMER | DAYS | 60 | 30 | 12 | 6 ← r.p.m. (Viscosity mPa · $s^{-1}$) |
|---|---|---|---|---|---|
| 30 | ↓ 0 | 8.41 | 9.56 | 11.3 | 12.3 |
| | 14 | 8.54 | 9.68 | 11.6 | 13.0 |
| | 56 | 8.52 | 9.72 | 11.65 | 13.1 |
| | 174 | 6.84 | 7.36 | 8.15 | 9.2 |
| 30* | 0 | — | 18.66 | 26.1 | 34.3 |
| | 14 | — | 16.92 | 23.55 | 32.0 |
| | 57 | — | 17.86 | 24.6 | 32.7 |
| | 189 | — | 15.12 | 19.8 | 24.7 |
| 50 | 0 | — | 15.4 | 20.5 | 25.8 |
| | 14 | — | 13.4 | 17.6 | 21.0 |
| | 55 | — | 13.3 | 17.1 | 20.9 |
| | 147 | — | 12.8 | 16.15 | 19.2 |
| 70 | 0 | — | 12.58 | 16.5 | 19.6 |
| | 13 | — | 12.20 | 14.9 | 17.4 |
| | 55 | — | 10.8 | 13.5 | 15.6 |
| | 147 | — | 10.76 | 13.4 | 15.3 |

*higher molecular weight polymer

EXAMPLE 4

Synthetic sea water is substituted for the water used in Example 1. All else remains equivalent. Results are shown in Table 4, below. As can be seen, the 30% AMPS copolymer failed after 197 days but showed good viscosity stability at 57 days. At 50–70% AMPS, however, viscosity stability is achieved after 177 and 190 days, respectively.

TABLE 4

THERMAL STABILITY UNDER ANAEROBIC CONDITIONS IN SYNTHETIC SEA WATER AT 90° C.

| MOLE % AMPS IN COPOLYMER | DAYS | 60 | 30 | 12 | 6 ← r.p.m. (Viscosity mPa · $s^{-1}$) |
|---|---|---|---|---|---|
| 30 | ↓ 0 | 8.46 | 9.74 | 11.6 | 12.6 |
| | 14 | 8.22 | 9.26 | 10.8 | 11.5 |
| | 57 | 8.26 | 9.46 | 10.8 | 11.4 |
| | 197 | 2.01 | — | — | — |
| 30* | 0 | — | — | 28.85 | 38.8 |
| | 14 | — | — | 27.1 | 36.3 |
| | 56 | — | — | 27.85 | 38.2 |
| | 182 | — | — | 21.5 | 27.4 |
| 50 | 0 | — | 12.24 | 15.85 | 19.3 |
| | 14 | — | 11.58 | 15.1 | 17.6 |
| | 28 | — | 11.46 | 14.65 | 17.1 |
| | 56 | — | 11.36 | 14.6 | 17.0 |
| | 177 | — | 10.48 | 12.9 | 14.9 |
| 70 | 0 | 9.86 | 13.2 | 15.9 | 19.2 |
| | 14 | 9.18 | 11.42 | 14.9 | 17.1 |
| | 56 | 9.63 | 11.92 | 15.25 | 18.6 |
| | 190 | 9.20 | 11.12 | 14.3 | 16.9 |
| 70 | 0 | 9.72 | 11.92 | 15.7 | 18.8 |

TABLE 4-continued

THERMAL STABILITY UNDER ANAEROBIC CONDITIONS IN SYNTHETIC SEA WATER AT 90° C.

| MOLE % AMPS IN COPOLYMER | DAYS | 60 | 30 | 12 | 6 ← r.p.m. (Viscosity mPa · $s^{-1}$) |
|---|---|---|---|---|---|
| | 14 | 9.22 | 11.32 | 14.9 | 17.1 |
| | 56 | 9.13 | 11.18 | 14.2 | 16.7 |
| | 190 | 9.12 | 11.08 | 14.35 | 16.7 |

*higher molecular weight material

EXAMPLE 5

The effect of harsh water and synthetic sea water on a 50% AMPS copolymer with AM is determined in accordance with the procedure of Example 1. The AMPS copolymer is a liquid material when dissolved. Again, viscosity degradation is averted. See Table 5, below.

TABLE 5

THERMAL STABILITY UNDER ANAEROBIC CONDITIONS - 50 MOLE % AMPS

| COMPOSITION OF WATER | DAYS | 60 | 30 | 12 | 6 (Viscosity mPa · $s^{-1}$) |
|---|---|---|---|---|---|
| 9% NaCl 1% $CaCl_2$ | 0 | — | 13.84 | 17.8 | 22.4 |
| | 14 | — | 12.04 | 14.4 | 16.1 |
| | 56 | — | 12.50 | 15.65 | 19.6 |
| | 149 | — | 12.52 | 15.7 | 19.7 |
| Synthetic Sea Water | 0 | — | 14.54 | 19.35 | 24.5 |
| | 14 | — | 13.52 | 16.6 | 21.0 |
| | 56 | — | 13.54 | 16.65 | 21.0 |
| | 149 | — | 12.9 | 16.15 | 20.7 |
| POLYMER CONCENTRATION 2000 p.p.m. | | | | | |

EXAMPLE 6

The procedures of Examples 1 and 3 are again followed except that the polymer solutions are maintained at 70° C. Results are shown in Table 6, below.

TABLE 6

THERMAL STABILITY OF AMPS COPOLYMERS AT 70° C.

| | MOLE % AMPS IN COPOLYMER | DAYS | 60 | 30 | 12 | 6 ← r.p.m. (mPa · $s^{-1}$) |
|---|---|---|---|---|---|---|
| 9% NaCl 1% $CaCl_2$ | 70 | ↓ 0 | — | 11.2 | 14.0 | 16.5 |
| | | 14 | — | 10.4 | 13.0 | 14.5 |
| | | 56 | — | 10.7 | 13.4 | 14.5 |
| | | 168 | — | 10.6 | 13.3 | 15.1 |
| | 50 | 0 | — | 14.2 | 18.0 | 21.0 |
| | | 14 | — | 14.7 | 19.4 | 23.8 |
| | | 56 | — | 14.7 | 19.5 | 23.8 |
| | | 168 | — | 14.8 | 19.4 | 23.6 |
| | 30 | 0 | 8.5 | 9.6 | 11.4 | 12.4 |
| | | 13 | 8.6 | 9.8 | 11.5 | 12.4 |
| | | 56 | 8.96 | 10.0 | 11.8 | 13.2 |
| | | 182 | 8.6 | 9.76 | 11.4 | 11.9 |
| | 70 | 0 | — | 12.8 | 16.6 | 19.8 |
| | | 14 | — | 11.9 | 15.3 | 18.0 |
| | | 56 | — | 12.2 | 15.65 | 18.3 |
| | | 196 | — | 12.2 | 15.7 | 18.4 |

TABLE 6-continued

| THERMAL STABILITY OF AMPS COPOLYMERS AT 70° C. | | | | | | |
|---|---|---|---|---|---|---|
| | MOLE % AMPS IN COPOLYMER | DAYS | 60 | 30 | 12 | mPa · $s^{-1}$ 6 ← r.p.m. |
| 9% NaCl | 50 | 0 | — | 15.7 | 20.8 | 26.0 |
| 9% NaCl | | 14 | — | 14.5 | 18.85 | 23.0 |
| 0.66% $CaCl_2$ | | 56 | — | 14.4 | 18.85 | 23.0 |
| 0.34% $MgCl_2$ | | 196 | — | 14.8 | 19.15 | 23.4 |
| | 30 | 0 | 8.41 | 9.56 | 11.3 | 12.3 |
| | | 14 | 8.30 | 9.36 | 11.0 | 12.0 |
| | | 56 | 8.65 | 9.88 | 11.6 | 12.3 |
| | | 174 | 8.73 | 9.92 | 11.65 | 12.4 |

EXAMPLE 7

Again following the procedure of Example 1 except that the copolymers are produced from the sodium salt of AMPS and sodium acrylate (SA), tests are conducted at 70° C. and 90° C. The results are set forth below in Table 7.

TABLE 7

THERMAL STABILITY OF Na AMPS: SODIUM ACRYLATE COPOLYMERS

| | MOLE % AMPS IN COPOLYMER | DAYS | 60 | 30 | 12 | Viscosity mPa · $s^{-1}$ 6 ← r.p.m. |
|---|---|---|---|---|---|---|
| 70° C. | 70 ↓ | 0 | — | 12.1 | 15.8 | 19.3 |
| | | 14 | — | 10.6 | 15.2 | 18.2 |
| | | 58 | — | 12.2 | 15.9 | 19.3 |
| | | 182 | — | 11.5 | 14.8 | 17.6 |
| | 50 | 0 | — | 12.4 | 16.3 | 19.9 |
| | | 14 | — | 11.9 | 15.1 | 18.2 |
| | | 56 | — | 12.4 | 15.7 | 19.3 |
| | | 167 | — | 11.8 | 14.8 | 19.1 |
| 90° C. | 70 | 0 | — | 12.1 | 15.8 | 19.3 |
| | | 14 | — | 10.9 | 13.85 | 16.3 |
| | | 58 | — | 11.4 | 14.9 | 17.8 |
| | 50 | 182 | — | 11.8 | 13.8 | 16.4 |
| | | 0 | — | 12.1 | 15.5 | 18.3 |
| | | 51 | — | 10.4 | 12.4 | 14.7 |
| | | 180 | — | 8.7 | 10.3 | 11.1 |

EXAMPLE 8 (COMPARATIVE)

The procedure of Example 1 is again followed except that the copolymer thereof is replaced by a terpolymer of 30 mole percent of the sodium salt of AMPS, 40 mole percent of AM and 30 mole percent of SA. As can be seen from Table 8, below, the viscosity stability of terpolymers is materially reduced after 196 days.

TABLE 8

THERMAL STABILITY OF Na AMPS (30 M %), AMD (40 M %), Na ACRYLATE (30 M %) AT 90° C.

| COMPOSITION OF TEST WATER | DAYS | 60 | 30 | 12 | Viscosity mPa · $s^{-1}$ 6 ← r.p.m. |
|---|---|---|---|---|---|
| 9% NaCl | ↓ 0 | | 13.8 | 18.4 | 22.2 |
| 1% $CaCl_2$ | 14 | — | 12.2 | 15.5 | 17.8 |
| | 56 | | 10.3 | 12.4 | 13.7 |
| | 196 | | 4.8 | 5.2 | — |
| 9% NaCl | 0 | | 14.3 | 18.8 | 22.7 |
| 0.66% $CaCl_2$ | 14 | | 12.5 | 15.8 | 18.3 |
| 0.34% $MgCl_2$ | 56 | | 10.6 | 14.0 | 16.6 |
| | 196 | | 4.6 | 6.3 | — |
| Synthetic | 0 | | 15.2 | 20.8 | 26.1 |
| Sea Water | 14 | | 12.3 | 17.9 | 21.4 |
| | 63 | | 11.2 | 13.4 | 16.3 |
| | 195 | | 5.3 | 6.0 | — |

EXAMPLE 9 (COMPARATIVE)

The adverse effects of divalent salts, i.e. calcium upon the viscosity of polyacrylamide are shown in Table 9, below.

TABLE 9

THERMAL STABILITY UNDER ANAEROBIC CONDITIONS 2% NaCl AT 90° C. POLYACRYLAMIDE (PAM)[1]

| $Ca^{2+}$ p.p.m. | DAYS | 60 | 30 | 12 | 6 | Viscosity mPa · $s^{-1}$ ← r.p.m. |
|---|---|---|---|---|---|---|
| 0 | ↓ 0 | 6.02 | 6.76 | 7.9 | — | |
| | 7 | 6.62 | 6.56 | 8.95 | — | |
| | 21 | 7.14 | 8.46 | 9.85 | — | |
| | 112 | 7.44 | 8.64 | 10.15 | — | |
| 100 | 0 | 5.79 | 6.46 | 7.4 | — | |
| | 21 | 5.96 | 6.66 | 7.6 | — | |
| | 152 | 4.28 | 4.50 | 4.65 | — | |
| 200 | 0 | 5.38 | 5.94 | 6.7 | — | |
| | 21 | 5.62 | 6.24 | 6.9 | — | |
| | 152 | 3.26 | 3.40 | 3.55 | — | |
| 500 | 0 | 4.83 | 5.34 | — | — | PRECIPITATE |
| | 21 | 2.73 | 2.66 | — | — | |
| | 152 | 1.90 | — | — | — | |
| 1000 | 0 | 4.50 | 4.94 | — | — | PRECIPITATE |
| | 21 | 1.89 | 1.82 | — | — | |
| | 152 | 1.46 | — | — | — | |

Polymer concentration = 1000 p.p.m.
1 = See Example 2

Since the AMPS copolymers used in the present invention are already known to be useful as viscosity control agents for water-flooding of sub-terranean petroleum-containing deposits, it is clear that the above example show that the specific AMPS copolymers hereof function in a manner superior to those of the prior art under the conditions described.

EXAMPLE 10

The following table shows the variation in solution viscosity of various AMPS copolymers with AM.

TABLE 10

| Mole % Amps | 30 | 12 | Viscosity mPa · $s^{-1}$ 6 rpm |
|---|---|---|---|
| 20 | 14.8 | 17.7 | 19.5 |
| 30 | 12.9 | 15.0 | 16.5 |
| 40 | 13.2 | 15.3 | 16.5 |
| 50 | 14.8 | 17.2 | 19.5 |
| 70 | 9.1 | 10.2 | 11.2 |
| 80 | 6.8 | 8.3 | 9.2 |
| 90 | 6.0 | 7.2 | 7.6 |
| 100 | 5.0 | 5.7 | 6.7 |

EXAMPLE 11

The thermal stability of a 50/50 AMPS/AM copolymer in 3400 p.p.m. T.D.S. brine at 90° C. and saturated with air is shown in Table 11, below.

TABLE 11

| Days | 30 | 12 | 6 | Viscosity mPa · $s^{-1}$ 3 rpm |
|---|---|---|---|---|
| 0 | 15.98 | 23.05 | 31.0 | 41.4 |
| 4 | 7.72 | 8.8 | — | — |
| 14 | 6.42 | 7.1 | — | — |
| 21 | 4.02 | 3.9 | — | — |

Polymer concentration = 1000 p.p.m.

We claim:

1. In a method for recovering petroleum from a subterranean petroleum-bearing deposit which comprises injecting an aqueous polymer solution into the area of said deposit through at least one input well to cause said petroleum to flow from said area for collection through at least one output well, the improvement which comprises maintaining and controlling the viscosity of said solution by utilizing, in the substantial absence of oxygen, a water-soluble copolymer containing from about 30–70 mole percent of 2-acrylamido-2-methylpropanesulfonic acid or a salt thereof and from about 70–30 mole percent of an acrylic monomer, the temperature at the petroleum-bearing deposit being at least 60° C.

2. A method according to claim 1 wherein said aqueous solution contains a divalent salt.

3. A method according to claim 2 wherein said divalent salt is present at a concentration of at least about 100 ppm.

4. A method according to claim 2 wherein said divalent salt is a calcium or magnesium salt or mixture thereof.

5. A method according to claim 1 wherein said acrylic monomer is acrylamide.

6. A method according to claim 1 wherein said acrylic monomer is sodium acrylate.

7. A method according to claim 1 wherein said copolymer contains from about 40–70 mole percent of 2-acrylamido-2-methylpropane sulfonic acid or salt thereof and from about 60–30 mole percent of an acrylic monomer.

8. A method according to claim 7 wherein the temperature at the petroleum-bearing deposit ranges from about 60° C. to about 120° C.

9. A method according to claim 7 wherein said acrylic monomer is acrylamide.

10. A method according to claim 7 wherein said acrylic monomer is sodium acrylate.

11. A method according to claim 7 wherein the temperature at the petroleum-bearing deposit ranges from about 70° C. to about 90° C.

* * * * *